United States Patent Office 3,038,883
Patented June 12, 1962

3,038,883
KETONE POLYSULFIDES
Lawrence E. Forman, Akron, Ohio, assignor to The Firestone Tire & Rubber Company, Akron, Ohio, a corporation of Ohio
No Drawing. Filed Apr. 14, 1958, Ser. No. 728,032
19 Claims. (Cl. 260—63)

This invention relates to curing agents for sulfur-vulcanizable rubber-like materials and, more particularly, to improved polysulfide type curing agents and curing processes in which these improved curing agents are employed.

In preparing a rubber composition for vulcanization or curing, the raw rubber (natural, synthetic or mixtures of natural and synthetic rubbers) is mixed with various compounding agents, including a curing agent and optionally one or more of the following: a softener or plasticizer, stearic acid or other pigment dispersing agent, carbon black, zinc oxide, silica, a carbonate filler or other filler, an accelerator, an activator or retarder, an antioxidant, and reclaimed rubber or a rubber extender. These components can be worked into a homogeneous composition in a banbury or on mixing rolls which are cooled to a temperature of about 70° C. to dissipate the frictional heat generated in the compounding operation. However, the rubber composition itself often reaches a temperature as high as 100–110° C., depending upon operating conditions. Consequently, the primary vulcanizing agent and any accelerators or activators employed therewith should not effect a substantial "pre-vulcanization" or "scorching" during the compounding operation as a result of the temperatures obtained. Alternatively, the rubber can be compounded in latex or water dispersion, as is known in the art.

As the art of vulcanizing rubber polymers has progressed, agents effecting a more rapid curing, either in conjunction with elemental sulfur or by themselves, have been developed for use in manufacturing rubber products. It has long been known that various organic compounds, including certain mercaptans, organic sulfides, substituted guanidines and aldehyde-amine condensates, greatly accelerate the vulcanizing action of elemental sulfur. Similarly, such compounds as the tetramethylthiuram mono- and di-sulfides, the metal dithiocarbamates, and various amines and amine salts have been found effective as secondary accelerators or activators. Many of these commonly employed materials, however, have been found undesirable, inter alia, because of their tendencies to promote scorching during the milling, extruding and calendering operations commonly employed in manufacturing rubber products.

More recently, it has been found possible to vulcanize or cure a sulfur-vulcanizable rubber by treating it with a phenol polysulfide in the absence of elemental sulfur, this process being known as NES curing. The phenol polysulfides having the probable structural formula:

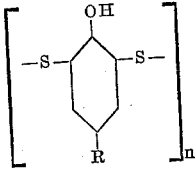

have been found effective, both in accelerating the vulcanizing action of elemental sulfur and as a primary vulcanizing agent in NES curing.

An object of this invention is to provide a new class of organic polysulfide curing agents characterized by their ability to cure sulfur-vulcanizable rubber compositions efficiently in the absence of free sulfur.

A further object of the invention is to provide a process for producing a new class of organic polysulfide curing agents which efficiently and economically may be employed in the curing of sulfur-vulcanizable rubbers.

An additional object of the invention is to provide a process for curing sulfur-vulcanizable rubbers containing a new class of polysulfide curing agents produced from enolizable ketones.

Generally described, the present invention comprises a polysulfide effective as a curing agent for sulfur-vulcanizable rubbers having the structural formula:

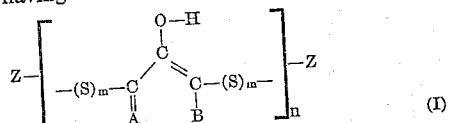

wherein A is hydrogen, alkyl, ketoalkyl, acyl, aryl, alkaryl or aralkyl; B is H, alkyl, ketoalkyl, acyl, aryl, alkaryl or aralkyl; wherein A and B can be joined in a ring; wherein $m$ is 1 to 3 and $n$ is at least 2; and wherein Z is H, X (a halogen).

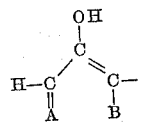

or

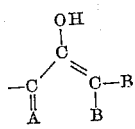

Since the molecular weights of the resins are not necessarily critical, the value for $n$ can vary over a wide range of from 2 to 100 or even 1000.

The present invention further includes a process for producing a polysulfide curing agent for sulfur-vulcanizable rubbers, which comprises reacting with a polysulfur halide (a polysulfur chloride, bromide or iodide) an enolizable ketone which, in the enol form, has the structural formula:

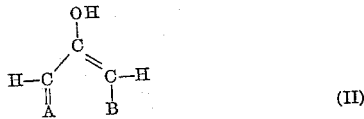

wherein A is hydrogen, alkyl, ketoalkyl, acyl, aryl, alkaryl or aralkyl; B is H, alkyl, ketoalkyl, acyl, aryl, alkaryl or aralkyl; and wherein A and B can be joined in a ring.

Also embraced by the invention is a process for curing a sulfur-vulcanizable rubber which comprises admixing with the rubber a polysulfide having the structural Formula I and heating the mixture to a vulcanizing temperature to form a vulcanizate.

In accordance with the present invention, it has been discovered that polysulfide compounds, equally effective curing agents to polyphenol sulfides, can be prepared by reacting an enolizable ketone with a sulfur monohalide or higher sulfide of chlorine, bromine or iodine. Ketones which are enolizable normally exist in a state wherein a portion of the ketone is in the tautomeric enol configuration and is in equilibrium with the ketone present in the keto configuration. When such ketones are reacted with a sulfur chloride in accordance with the invention, the polysulfur chloride and enol tautomer form a polysulfide and hydrochloric acid. The insolubility of the hydrochloric acid in the reaction mixture and its elimination promotes the rapid conversion of ketones in the keto form to the enol tautomer. This process thus continues until substantially all of the ketone is converted to the enol form and is reacted with the sulfur chloride to form the polysulfide.

The enolizable ketones generally operative in the invention are those having a hydrogen atom attached directly to an alpha-carbon atom. Suitable ketones which can be employed in accordance with the invention include, without limitation, acetone, acetyl acetone, cyclohexanone, methyl cyclohexanone, isophorone, dihydroresorcinol (keto form), methyl-ethyl ketone, diethyl ketone, methyl-amyl ketone and the like.

The polysulfur chlorides operative in the invention possess the formula $S_wCl_2$ wherein $w$ is at least 2. Examples are sulfur monochloride ($S_2Cl_2$), sulfur tritadichloride ($S_3Cl_2$), sulfur tetritadichloride ($S_4Cl_2$), any higher polythiodichloride, and mixtures of any polysulfur chlorides. Alternatively, a solution of sulfur in a sulfur chloride is an effective reagent in the invention, regardless of whether or not polysulfides higher than $S_2Cl_2$ are actually present. Bromine or iodine can be substituted for chlorine in the foregoing.

Preferably, the enolizable ketone and sulfur chloride is reacted in organic solvent medium at reflux. Alternatively, the reaction can be carried out below the boiling point of the more volatile of the reactants or solvent or can be carried out at higher temperatures in a closed system. Suitable organic solvents include, without limitation, carbontetrachloride, benzene, liquid halobenzenes such as monochloro- and monofluorobenzene, chloroform, ethylene dichloride, trichloroethylene, tetrachloroethane, propylene dichloride and the like.

The polysulfides prepared in accordance with the present invention are operative as vulcanizing agents per se or accelerators in the curing of any of the sulfur-vulcanizable rubbers employed by the art including, without limitation, natural rubber, various synthetic rubbers such as SBR (butadiene-styrene), BR (butadiene rubbers), IR (synthetic isoprene rubbers), ABR (acrylate-butadiene rubbers), PBR (pyridine-butadiene rubbers), SIR (styrene-isoprene rubbers), neoprene (polychloroprene or CR), butyl rubber (IIR), and suitable mixtures thereof. (The abbreviations are in accord with the ASTM designation: D1418–56T.) The usual curing temperatures employed by the art can also be employed when using the polysulfides of the present invention. For best results, curing temperatures of from about 140° to about 400° F. and preferably from about 250° to about 350° F. are employed. The amount of the ketone polysulfide employed will depend upon the particular composition being vulcanized and, in general, the polysulfides of the invention are employed in the same concentrations as the phenol polysulfides and other curing agents currently employed in the art, for example, from one to fifty parts of curing agent per hundred parts of the rubber (phr.).

Having generally described the invention, the following examples are presented to illustrate the production of the polysulfides of the invention and their utility as curing agents.

EXAMPLE 1

Forty grams (0.4 mole) of acetyl acetone and 50 cc. of benzene are placed in a 500 cc. flask equipped with reflux condenser and dropping funnel and heated to the boiling point. Fifty-four grams (0.4 mole) of sulfur monochloride is dissolved in 25 cc. of benzene and added dropwise over a period of about two hours to the boiling solution in the flask. The solution in the flask turns a dark red and HCl gas is evolved. Following addition of the $S_2Cl_2$, the solution is refluxed until substantially no more HCl is evolved. The solution, now jet black, is filtered and the residue is washed with benzene. The black crystals obtained have a melting point of 118–119° C. When recrystallized from benzene, the resulting crystals are green, have a melting point of 119–120° C., and are identified as sulfur. The filtrate is heated to boiling, activated carbon is added, and the solution is filtered.

This procedure is repeated three times. The resulting liquid is steam distilled to remove volatile solvent. The resulting product is a black, resinous material weighing 48 grams. The product is identified as an acetyl acetone polysulfide resin having the structural formula:

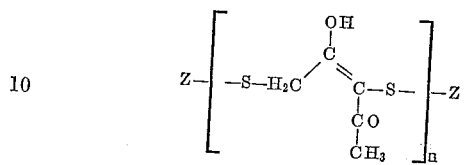

EXAMPLE 2

Fifty-eight grams (1 mole) of acetone and 100 ml. of benzene are placed in a 3-neck, 1-liter, round-bottom flask equipped with a reflux condenser and a dropping funnel. The solution is heated to boiling, and then a solution of 35.2 grams (1.1 gram-atoms) of sulfur and 148.5 grams (1.1 moles) of sulfur monochloride in 75 ml. of benzene is added dropwise. The reaction mixture darkens and HCl is given off. After addition of all of the sulfur chloride solution the reaction mixture is refluxed until evolution of HCl ceases. The mixture is allowed to cool to room temperature, and then the solvent is removed under reduced pressure. A dark resin remains and is identified as an acetone polysulfide resin having the following formula:

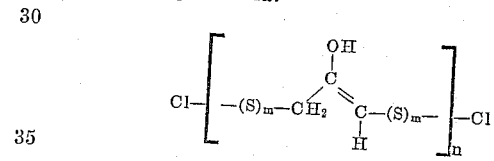

EXAMPLE 3

Three hundred and fifty ml. of carbontetrachloride and 83.3 grams (0.603 mole) of isophorone are introduced into a 3-neck, 1-liter, round-bottom flask with attached reflux condenser and dropping funnel. The solution is heated to boiling, whereupon 81.4 grams (49 ml.) of sulfur monochloride is added dropwise. The solution turns very dark in color and HCl is evolved. After being allowed to cool to room temperature, the solvent is distilled off under reduced pressure and the product is partially distilled at from 8–10 mm. pressure to a final temperature of 170° C. A small amount of sulfur separates out from the reddish oil distilling in the condenser. Following the distillation, 84.5 grams of black, resinous product is obtained. The quantity of distillate obtained is 27.5 grams. The total yield is 112 grams, constituting a high yield of an isophorone polysulfide resin having the structural formula:

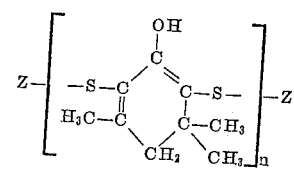

EXAMPLE 4

Seven hundred ml. of carbontetrachloride and 221.4 grams (1.6 moles) of isophorone are introduced into a 2-liter, round-bottom flask equipped with reflux condenser. The solution is distilled to remove an azeotrope of carbontetrachloride and water until all water is removed from the flask. Then 326.7 grams (2.42 moles) of sulfur monochloride dissolved in 100 ml. of carbontetrachloride is added dropwise during a period of about 1½ hours. The mixture is refluxed for about six hours. The bulk of the carbontetrachloride is distilled off at atmospheric pressure and the remainder is removed by vacuum distillation, during which a hard, crusty material is formed. However, as the temperature is gradually raised, this material melts, with the final distillation temperature being 160° C. at 50 mm. pressure. The hot, black resin is poured out of the flask and weighed. A yield of 308.8 grams of isophorone polysulfide resin is obtained.

EXAMPLE 5

Sixty-three and eight-tenths grams (1.1 moles) of acetone and 100 ml. of benzene are placed in a 3-neck, 1-liter flask equipped with a reflux condenser and a dropping funnel. The solution is heated to boiling, and then a solution of 64 grams (2 gram-atoms) of sulfur and 135 grams (1 mole) of sulfur monochloride in 75 ml. of benzene is added dropwise during a period of about two hours. The mixture is refluxed for another hour and then is allowed to cool to room temperature. Solvent is removed by distillation under reduced pressure. The hot black resinous product is poured from the flask and is identified as an acetone polysulfide resin of the following formula:

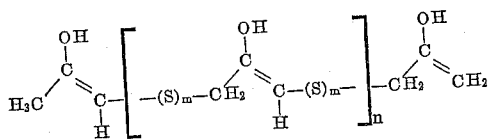

EXAMPLE 6

One hundred thirty-eight and two-tenths grams (1 mole) of isophorone and 500 cc. of carbontetrachloride are placed in a 1-liter, round-bottomed, 3-neck flask equipped with reflux condenser and dropping funnel. One hundred and thirty-five grams of sulfur monochloride is added dropwise. The contents of the flask are refluxed for about six hours and the solvent is stripped off at atmospheric pressure. The remaining solvent and unreacted isophorone are distilled off at a reduced pressure of 24 mm. and a final temperature of 189° C. A substantial yield (119.5 grams) of isophorone polysulfide resin is obtained.

EXAMPLE 7

Ninety-eight and one-tenth grams (1 mole) of cyclohexanone is dissolved in 350 ml. of carbontetrachloride and introduced into a 1-liter, round-bottomed flask equipped with reflux condenser and dropping funnel. The solution is heated to boiling and 135 grams (1 mole) of sulfur monochloride is added dropwise over a period of about two hours. The solution is then refluxed for an additional four hours with the HCl formed being absorbed in a water trap. The excess solvent is distilled off, the final portion being removed under vacuum at a final temperature of 150° C. and 50 mm. pressure. A yield of 141.7 grams of dark brown, resinous material is obtained, constituting a high yield of a cyclohexanone polysulfide resin of the structural formula:

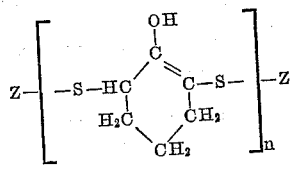

EXAMPLE 8

One hundred ten and one-half grams (0.987 mole) of methyl cyclohexanone is dissolved in 300 ml. of carbontetrachloride and introduced into a round-bottomed flask equipped with reflux condenser and dropping funnel. The solution is heated at gentle reflux, and sulfur monochloride is added dropwise over a period of about one hour and the solution is then refluxed for an additional five hours. The solvent was distilled away under vacuum with a final temperature of 144° C. A yield of 163.3 grams of dark resin is formed, constituting a high yield of a methyl cyclohexanone polysulfide resin having the structural formula:

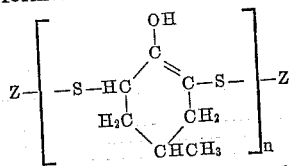

In Table I below, Examples 9 and 10 are presented to illustrate the performance of the isophorone polysulfide resin prepared in accordance with this invention with that of elemental sulfur. All cures are in minutes at 280° F.

*Table I*

| Rubber Composition | Example 9 | Example 10 |
|---|---|---|
| SBR (LTP)[1] | 100.0 | 100.0 |
| Sulfur | 1.7 | 5.3 |
| Isophorone Polysulfide | 45.0 | 45.0 |
| Carbon Black (HAF) | 2.4 | 2.4 |
| Zinc Oxide | 2.5 | 2.5 |
| Stearic Acid | 2.6 | 2.6 |
| Paraflux [2] | 1.0 | 1.0 |
| Santocure [3] | | |
| Stress-Strain Properties: | | |
| Modulus @ 400%— | | |
| 40' | 400 | 1,550 |
| 80' | 1,950 | 2,000 |
| 120' | 2,425 | 2,225 |
| Tensile @ Break— | | |
| 40' | 1,100 | 3,000 |
| 80' | 2,750 | 2,950 |
| 120' | 2,800 | 3,050 |
| Elongation @ Break— | | |
| 40' | 900 | 650 |
| 80' | 500 | 530 |
| 120' | 450 | 520 |
| Aged Stress-Strain Properties (Oven Aged 4 days @ 212° F.): | | |
| Tensile @ Break— | | |
| 40' | 2,100 | 2,750 |
| 80' | 2,150 | 2,550 |
| 120' | 2,250 | 2,550 |
| Elongation @ Break— | | |
| 40' | 250 | 290 |
| 80' | 210 | 290 |
| 120' | 220 | 290 |

[1] Rubbery butadiene-styrene copolymer prepared by emulsion polymerization at 40° F.
[2] Asphaltic flux product.
[3] N-cyclohexyl-2-benzothiazole-sulfenamide.

In Table II below, Examples 11–13 are presented to further demonstrate the performance of the isophorone polysulfide resin of the invention in a rubber composition. All cures are in minutes at 280° F.

*Table II*

| Rubber Composition | 11 | 12 | 13 |
|---|---|---|---|
| SBR (LTP) | 100.0 | 100.0 | 100.0 |
| Carbon Black (HAF) | 45.0 | 45.0 | 45.0 |
| Zinc Oxide | 2.4 | 2.4 | 2.4 |
| Stearic Acid | 2.5 | 2.5 | 2.5 |
| Isophorone Polysulfide | 5.0 | 4.2 | 4.2 |
| Santocure | | | 1.0 |
| Stress-Strain Properties: | | | |
| Modulus @ 400%— | | | |
| 60' | 625 | 500 | 1,475 |
| 80' | 1,025 | 850 | 1,700 |
| 100' | 1,350 | 1,125 | 1,800 |
| Tensile @ Break— | | | |
| 60' | 1,500 | 1,225 | 3,150 |
| 80' | 2,325 | 1,950 | 3,225 |
| 100' | 2,800 | 2,500 | 2,075 |
| Elongation @ Break— | | | |
| 60' | 920 | 930 | 700 |
| 80' | 820 | 830 | 670 |
| 100' | 760 | 790 | 630 |

In Table III below, Examples 14–16 are presented to compare the performance of polycyclohexanone sulfide resins of the invention with sulfur as a curing agent. All cures are in minutes at 280° F.

Table III

| Rubber Composition | Examples | | |
|---|---|---|---|
|  | 14 | 15 | 16 |
| SBR (LTP) | 100.0 | 100.0 | 100.0 |
| Carbon Black (HAF) | 45.0 | 45.0 | 45.0 |
| Zinc Oxide | 3.0 | 3.0 | 3.0 |
| Stearic Acid | 3.0 | 3.0 | 3.0 |
| Paraflux | 3.0 | 3.0 | 3.0 |
| Sulfur | 5.0 | 5.0 | 5.0 |
| Cyclohexanone Polysulfide | 1.35 |  |  |
| Methylcyclohexanone Polysulfide |  | 3.4 |  |
| Santocure |  |  | 3.7 |
| Santocure | 1.0 | 1.0 | 1.0 |
| Normal Stress-Strain Properties: | | | |
| Modulus @ 300%— | | | |
| 45′ |  |  |  |
| 60′ |  | 600 | 575 |
| 90′ |  | 700 | 675 |
| Tensile @ Break— | | | |
| 45′ |  |  | 800 | 750 |
| 60′ | 3,125 | 2,200 | 2,500 |
| 90′ | 2,850 | 2,325 | 2,725 |
|  | 2,475 | 2,575 | 2,900 |
| Elongation @ Break— | | | |
| 45′ |  |  |  |
| 60′ |  | 730 | 820 |
| 90′ | 270 | 710 | 810 |
|  | 310 | 690 | 810 |
|  | 150 |  |  |
| Aged Stress-Strain Properties (Oven aged 4 days @ 212° F.): | | | |
| Modulus @ 300%— | | | |
| 45′ |  |  |  |
| 60′ |  | 2,325 | 2,375 |
| 90′ |  | 2,225 | 2,325 |
|  |  | 2,150 | 2,225 |
| Tensile @ Break— | | | |
| 45′ |  |  |  |
| 60′ | 2,000 | 3,275 | 3,350 |
| 90′ | 2,225 | 3,300 | 3,500 |
|  | 1,775 | 3,475 | 3,450 |
| Elongation @ Break— | | | |
| 45′ |  |  |  |
| 60′ | 70 | 450 | 440 |
| 90′ | 70 | 450 | 480 |
|  | 50 | 490 | 480 |

From the foregoing examples, it is apparent that the curing agents of the present invention are markedly superior to elemental sulfur in their curing ability.

Since modification of the invention will be apparent to those skilled in the art, it is intended that the invention be limited only by the scope of the appended claims.

What is claimed is:

1. A resinous polysulfide polymer consisting essentially of repeating units of the following formula:

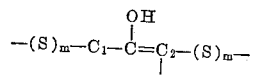

wherein $C_1$ and $C_2$ are carbon atoms and wherein the indicated free valences of such carbon atoms are satisfied by substance selected from the group consisting of hydrogen, alkyl, acetyl and divalent aliphatic hydrocarbon radical linking $C_1$ and $C_2$ and having three carbon atoms in a straight chain between terminating valences, and any unsaturation in said divalent hydrocarbon radical being a carbon-to-carbon double bond, and wherein $m$ is an integer from one to three.

2. A resinous polysulfide polymer consisting essentially of repeating units of the following formula:

$$-(S)_m-CH_2-\overset{OH}{\underset{|}{C}}=CH-(S)_m-$$

wherein $m$ is an integer from one to three.

3. A resinous polysulfide polymer consisting essentially of repeating units of the following formula:

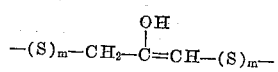

wherein $m$ is an integer from one to three.

4. A resinous polysulfide polymer consisting essentially of repeating units of the following formula:

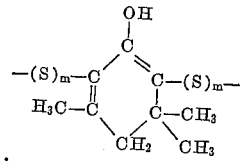

wherein $m$ is an integer from one to three.

5. A resinous polysulfide polymer consisting essentially of repeating units of the following formula:

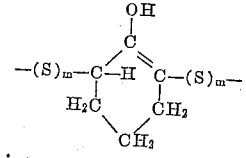

wherein $m$ is an integer from one to three.

6. A resinous polysulfide polymer consisting essentially of repeating units of the following formula:

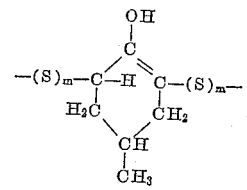

wherein $m$ is an integer from one to three.

7. A process for preparing a resinous polysulfide polymer as defined by claim 1, which comprises reacting (1) an enolizable ketone which in the enol form has the structural formula:

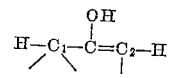

wherein $C_1$ and $C_2$ are carbon atoms and wherein the indicated free valences of such carbon atoms are satisfied by radicals selected from the group consisting of hydrogen, alkyl, acetyl and divalent aliphatic hydrocarbon radical linking $C_1$ and $C_2$ and having three carbon atoms in a straight chain between terminating valences, and any unsaturation in said divalent hydrocarbon radical being a carbon-to-carbon double bond with (2) a sulfur halide having the formula $S_wX_2$, wherein $w$ is an integer from two to four and X is a halogen selected from the group consisting of chlorine, bromine and iodine.

8. The process of claim 7 in which the ketone is acetone.

9. The process of claim 7 in which the ketone is acetyl acetone.

10. The process of claim 7 in which the ketone is isophorone.

11. The process of claim 7 in which the ketone is cyclohexanone.

12. The process of claim 7 in which the ketone is methyl cyclohexanone.

13. The process of claim 7 in which the reaction is carried out in the presence of an inert organic solvent at reflux temperature.

14. A process of curing a sulfur-vulcanizable diene rubber polymer, which comprises admixing with the rubber the resinous polysulfide polymer defined by claim 1, and heating the mixture to form a vulcanizate.

15. The process of claim 14 in which the polysulfide polymer is defined by claim 2.

16. The process of claim 14 in which the polysulfide polymer is defined by claim 3.

17. The process of claim 14 in which the polysulfide polymer is defined by claim 4.

18. The process of claim 14 in which the polysulfide polymer is defined by claim 5.

19. The process of claim 14 in which the polysulfide polymer is defined by claim 6.

References Cited in the file of this patent

UNITED STATES PATENTS

| | | |
|---|---|---|
| 1,218,713 | Stern | Mar. 13, 1917 |
| 2,039,206 | Baer | Apr. 28, 1936 |
| 2,313,611 | Abramowitz | Mar. 9, 1943 |
| 2,327,966 | Morey | Aug. 24, 1943 |
| 2,422,156 | Wolf et al. | June 10, 1947 |
| 2,470,545 | Blake | May 17, 1949 |
| 2,489,249 | Adelson | Nov. 29, 1949 |
| 2,495,145 | Smith et al. | Jan. 17, 1950 |
| 2,644,811 | Beretvas | July 7, 1953 |
| 2,734,869 | Mullen et al. | Feb. 14, 1956 |

UNITED STATES PATENT OFFICE
CERTIFICATE OF CORRECTION

Patent No. 3,038,883                                        June 12, 1962

Lawrence E. Forman

It is hereby certified that error appears in the above numbered patent requiring correction and that the said Letters Patent should read as corrected below.

Column 2, line 20, for "halogen)." read -- halogen), --; same column 2, lines 28 to 32, the formula should appear as shown below instead of as in the patent:

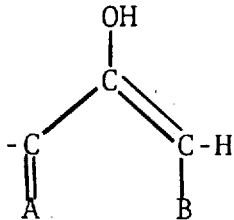

Signed and sealed this 5th day of April 1966.

(SEAL)
Attest:

ERNEST W. SWIDER                             EDWARD J. BRENNER
Attesting Officer                               Commissioner of Patents